US009274910B2

(12) United States Patent
Duffie et al.

(10) Patent No.: US 9,274,910 B2
(45) Date of Patent: Mar. 1, 2016

(54) AUTOMATIC TEST MAP GENERATION FOR SYSTEM VERIFICATION TEST

(75) Inventors: Paul Kingston Duffie, Palo Alto, CA (US); Andrew Thomas Waddell, Portola Valley, CA (US); Adam James Bovill, San Francisco, CA (US); Yujie Lin, Sunnyvale, CA (US); Pawan Singh, Sunnyvale, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 1330 days.

(21) Appl. No.: 12/201,797

(22) Filed: Aug. 29, 2008

(65) Prior Publication Data

US 2010/0057704 A1 Mar. 4, 2010

(51) Int. Cl.
*G06F 17/30* (2006.01)
*G06F 11/22* (2006.01)

(52) U.S. Cl.
CPC ...... *G06F 11/2268* (2013.01); *G06F 17/30592* (2013.01)

(58) Field of Classification Search
CPC .......................... G06F 17/30; G06F 17/30592
USPC .................. 707/802–811, 600–609; 709/201
See application file for complete search history.

(56) References Cited

U.S. PATENT DOCUMENTS 5,557,780 A * 9/1996 Edwards et al. ................ 703/27
6,336,124 B1 * 1/2002 Alam et al. .................. 715/205
2002/0138491 A1 * 9/2002 Bax et al. ...................... 707/100
2003/0007397 A1 1/2003 Kobayashi et al.
2005/0065845 A1 3/2005 Deangelis
2006/0047652 A1 3/2006 Pandit et al.
2006/0161508 A1 * 7/2006 Duffie et al. .................... 706/55
2006/0218158 A1 * 9/2006 Stuhec et al. ................. 707/100
2007/0168380 A1 * 7/2007 Chitrapura et al. ........... 707/102

OTHER PUBLICATIONS

International Search Report and Written Opinion, PCT Application No. PCT/US2009/054249, Oct. 9, 2009, 10 pages.

* cited by examiner

*Primary Examiner* — Hosain Alam
*Assistant Examiner* — Tuan-Khanh Phan
(74) *Attorney, Agent, or Firm* — Haynes Beffel & Wolfeld LLP

(57) ABSTRACT

A response map descriptively modeling the textual format of a test response of a system verification test is created without a priori understanding of the format of the given response. Such response map is applied to the test response or other similar test responses that share the same format. More specifically, a method of identifying and extracting one or more formats of textual data included in test responses from system verification testing of a system under test is provided, by receiving a first test response including first textual data in one or more formats, generating a response map descriptively modeling the first test response without a priori information of the one or more formats, and applying the response map to a second test response to identify and extract second textual data from the second test response. The second textual data is also in the one or more formats.

31 Claims, 11 Drawing Sheets

AUTOMATIC TEST MAP GENERATION FOR SYSTEM VERIFICATION TEST

BACKGROUND OF THE INVENTION

1. Field of the Invention

The present invention relates to automation of system verification test (SVT) and, more specifically, to extracting information from unstructured textual data obtained from SVT on a System Under Test (SUT).

2. Description of the Related Art

Most systems, whether it is a hardware system or a software system, requires quality assurance (QA) and system verification tests (SVT) before it is released for actual use by the public. It is preferable to automate SVT, so that the SVT process can be carried out efficiently and accurately. Software test automation in many cases requires that a testing program emulate a human interacting with a command-line interface (CLI) via protocols such as telnet, SSH (Secure Shell), or via a serial port. The test program sends a command to a System Under Test (SUT) to perform a configuration step in the test or to extract information from the SUT.

The responses received from the SUT are typically text, formatted in a way intended for human operators to digest. But unlike formats intended for processing by computers (like extensible markup language, XML), these human-readable texts can be complicated for a computer such as a SVT server to "understand" and process. In other words, when a test program on a SVT server needs to use information exposed in the textual responses from the SUT, there is considerable work involved to extract that information, which can be labor-intensive and error-prone. For example, in order to extract such data from text format responses from the SUT, conventional SVT programs use so-called "parsing algorithms" that deconstruct the textual response. Each command of the SVT typically produces a different response format and therefore requires that new parsing software is written to deconstruct or parse that new type of response. Writing such parsing software is labor-intensive and error-prone.

In some conventional cases, "template" approaches have been used to extract data from SVT responses. One can describe a template for a given response structure (perhaps using a general software tool for this purpose) and a more general piece of parsing code uses the template to extract certain data. FIG. 1 illustrates a conventional method of parsing SVT responses from the SUT. The SVT testing system (server) receives 102 an unstructured response. Upon receipt of the unstructured response, a parser appropriate for the type of structured response is selected 104 with a priori knowledge of the format of the unstructured response. A priori knowledge may come, for example, from the fact that the recipient of the response knows the command that was issued to the SUT. The selected parser is used to parse 106 the response and generate test values from the SVT response.

However, such conventional parsing method of FIG. 1 requires a priori knowledge of the format of the unstructured response, which may not always be available. If the format of the response changes from response to response, the existing parsers may not be able to accommodate such changes and parse the response with the changed format. Thus, a new parser will have to be programmed to accommodate such changed format of the SVT response, which is labor-intensive and error-prone.

SUMMARY OF THE INVENTION

A suitable template (or "response map") modeling the textual format of a test response is created without any a priori understanding of the format of the given response, based upon only a sample of the response. The generated response map can then be applied to the test response or saved and used for other similar test responses that share the same format.

More specifically, embodiments of the present invention include a method of identifying and extracting one or more formats of textual data included in test responses from system verification testing of a system under test, where the method comprises receiving a first test response including first textual data in one or more formats, generating a response map descriptively modeling said first test response without a priori information of said one or more formats, and applying the response map to a second test response to identify and extract second textual data from the second test response, the second textual data also being in said one or more formats. The second test response may be the same one as the first test response, or one that is different from the first test response but including data with the same format as that in the first test response. This present invention enables system verification test to be performed without the manual process of writing parsing software to extract data from the textual responses or to create a template manually for the same purpose. One of the results of this automatic parsing of the present invention is the identification of the data that are available from the response in a format that is suitable for a human to understand and select from, when trying to extract specific data from a given response.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

At a high level, the present invention provides software for automatic generation and application of a response map to SVT responses from a SUT, so that the test responses may be parsed and presented to a computer automatically with minimal human intervention. Without any a priori understanding of the format of a given response, a suitable template (or "response map") is created for that style or format of response by inference in such a way that the resulting response map can be used for analyzing future responses that are expected to have similar formats. Further, such response map generation may occur "on the fly" in real time as a sample response is received by the SVT system, with sufficient consistency, so that queries can be made against one instance of a block of text and, using automatic map generation, these same queries can be expected to continue to be valid against future examples of other similar test response with the same format.

The term "response map" herein is used to refer to a descriptive model for identifying and extracting selected data from various blocks of text that share a common format or style. In the practical application of the response map in the present invention, the blocks of text form at least a part of the SVT response(s) from an SUT, and may be originally intended for interpretation by humans. A "response mapper" herein refers to software that can be applied to any textual response in combination with an appropriate response map to identify data in that response and make it available for extraction. Using response maps and a response mapper, the present invention obviates the conventional procedural approach of writing different custom parsing software to parse each different style of response. In contrast, the present invention employs a descriptive approach in which each new style or format of response requires only that a new map be defined, but requires no new parsing software to be written.

Figure 1:
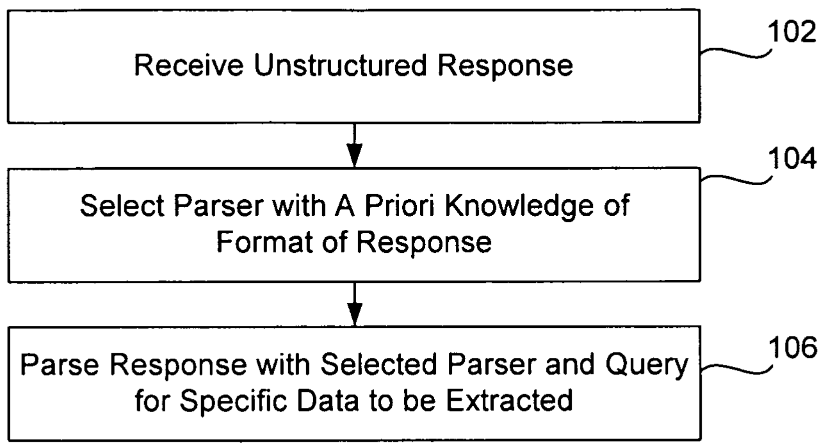
FIG. 1 illustrates a conventional method of parsing System Verification Test (SVT) responses from the system under test (SUT).
Figure 2:
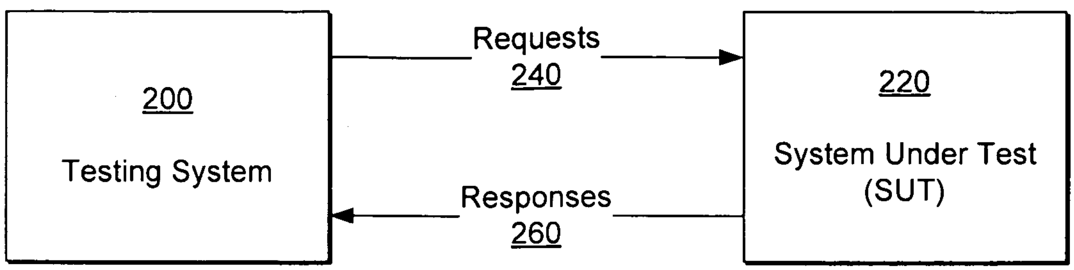
FIG. 2 illustrates the architecture of a System Verification Test (SVT) system, according to one embodiment of the present invention.

Turning to FIG. 2, the architecture of a System Verification Test (SVT) system according to one embodiment of the present invention is illustrated. The SVT system includes a testing system 200 and a system under test (SUT) 220. Testing system 200 verifies the functionalities of, and assures the quality of, the System Under Test (SUT) 220. The SUT 220 may be any type of hardware device, such as a computer, a networking device, a router, etc., or can also be computer software running on a computer. Testing system 200 sends various requests 240 to the SUT 220 to test the functionalities of SUT 220. Such requests 240 may be a set of commands designed to test the functionalities of interest of SUT 220. In response, SUT 220 sends responses 260 back to the testing system 200 that correspond to the commands. In one embodiment, the responses 260 are in textual format so that a human operator of testing system 200 may understand conveniently. However, the responses 260 are not in a format that can be utilized by testing system 200 (which is typically a computing device) easily for other software applications. Thus, according to the present invention, testing system 200 automatically parses a sample response among the responses 260 to generate a response map, and applies the response map to that sample responses or other responses 260 to automatically extract data of interest from the responses 260, as will be explained in more detail below. As a result, the responses 260 may be used by computers such as testing system 200 or other computers.

Figure 3:
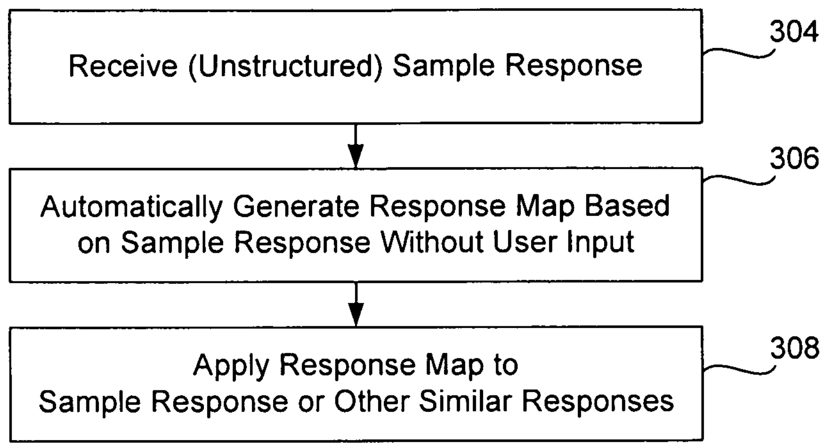
FIG. 3 illustrates a method of generating and using a response map to parse SVT responses from the SUT, according to one embodiment of the present invention.

FIG. 3 illustrates a method of generating and using a response map to parsing SVT responses from the SUT, according to one embodiment of the present invention. First, in step 304, the testing system 200 receives a sample response 260 from the SUT 220. In one embodiment, such sample response 260 may be an unstructured text response without a fixed format. The following EXAMPLE 1 is a simple example of a sample test response that may be received from a network switch SUT 220 as a result of system verification test on the SUT 220.

EXAMPLE 1

Uptime is 10 weeks, 5 days, 6 hours, 5 minutes
System returned to ROM by power-on

| | |
|---|---|
| Motherboard assembly number: | 73-7055-08 |
| Power supply part number: | 341-0034-01 |
| Motherboard serial number: | CAT0848076Z |
| Power supply serial number: | DAB08440HMS |

| Switch | Ports | Model | SW Version | SW Image |
|---|---|---|---|---|
| 1 | 26 | WS-C3750-24TS | 12.2(20)SE3 | I5K91-M |
| 2 | 24 | WS-C2950-22T | 12.1(20)SE2 | I2K57-A |
| 3 | 12 | WS-C3750-12A | 12.4(26) | I5K91-B |
| 4 | 26 | WS-C2940-24QQ | 12.3(10)SE1 | I5L91-X |
| 5 | 8 | AB-C4420-8TS | 12.2(20)SE3 | I4L91-X |

Based on the unstructured sample response, testing system 200 automatically generates a response map that descriptively models the sample response to identify and extract selected data from various blocks of text in the sample response or other similar responses that share a common format or style. The response map is generated using an extensible algorithm, using heterogeneous components referred to as "mappers" or "auto-mappers" that identify certain formats of text in the sample response. Each mapper is configured to identify its corresponding format of text in the sample response, reviews the sample response, and contributes to the final response map that models the sample response. Because different auto-mappers may be optimized for analyzing different portions of a response (such as name/value pairs, tables, repeating multi-line structures, etc.), each auto-mapper is provided with the subset(s) of the response that have already been successfully parsed by prior auto-mappers in the chain, and returns the additional subset(s) of the response that itself has successfully parsed, thereby adding to the overall response map corresponding to the sample response.

The way in which the auto-mappers express the way to parse a given section of the sample response is via common mapping primitives such as regular expressions and table definitions (for example, identifying tables within the response along with how to identify row and column boundaries in the response). In addition, the auto-mappers define a set of queries that may be relevant to users that wish to extract data from the information resulting from applying these primitives.

For example, a name-value pair auto-mapper may define a query that allows users to easily indicate that they want to extract the value of a portion of the response corresponding to a value by name, where the name corresponds to, for example, a heading in front of that value in the sample response. For another example, a table auto-mapper may define a query that allows a user to retrieve the value of a cell in a table found in the sample response based on the name of the column and the value in a cell in the same row corresponding to a "key" column (which is explained below). The manner in which the auto-mappers such as the name-value pair mappers and the table mappers identify their associated format of text and generate queries is explained in more detail below with reference to FIGS. 4A, 5A, and 5B.

The following XML code (EXAMPLE 2) illustrates an example of a response map generated based on the sample response (EXAMPLE 1) above, according to the method of FIG. 3 in accordance with the present invention.

EXAMPLE 2

```
<?xml version="1.0" encoding="utf-8"?>
<ResponseMap>
  <samples>
    <item name="sample1">
      <response>
        <body>Uptime is 10 weeks, 5 days, 6 hours, 5 minutes
System returned to ROM by power-on
Motherboard assembly number:   73-7055-08
Power supply part number:      341-0034-01
Motherboard serial number:     CAT0848076Z
Power supply serial number:    DAB08440HMS
Switch  Ports  Model            SW Version   SW Image
1       26     WS-C3750-24TS    12.2(20)SE3  I5K91-M
2       24     WS-C2950-22T     12.1(20)SE2  I2K57-A
3       12     WS-C3750-12A     12.4(26)     I5K91-B
4       26     WS-C2940-24QQ    12.3(10)SE1  I5L91-X
5        8     AB-C4420-8TS     12.2(20)SE3  I4L91-X
</body>
      </response>
    </item>
  </samples>
  <selectedSample>sample1</selectedSample>
  <mapperProperties>
    <item type=
    "com.fnfr.svt.mapping.regex.RegexMapperProperties">
      <regexMaps>
        <item name="colon__auto1">
          <groups>
            <item name="heading">
              <regex>Motherboard assembly
              number\\s+:\\s</regex>
```

-continued

```
              <start>0</start>
              <end>34</end>
            </item>
            <item name="Motherboard__assembly__number">
              <regex>\\S+</regex>
              <named>true</named>
              <start>34</start>
              <end>44</end>
            </item>
          </groups>
          <sampleMatch>Motherboard assembly number    :
          73-7055-08</sampleMatch>
          <regexMapMode>Line</regexMapMode>
          <optional>true</optional>
        </item>
        <item name="colon__auto2">
          <groups>
            <item name="heading">
              <regex>Power supply part number\\s+:\\s</regex>
              <start>0</start>
              <end>34</end>
            </item>
            <item name="Power__supply__part__number">
              <regex>\\S+</regex>
              <named>true</named>
              <start>34</start>
              <end>45</end>
            </item>
          </groups>
          <sampleMatch>Power supply part number    :
          341-0034-01</sampleMatch>
          <regexMapMode>Line</regexMapMode>
          <optional>true</optional>
        </item>
        <item name="colon__auto3">
          <groups>
            <item name="heading">
              <regex>Motherboard serial number\\s+:\\s</regex>
              <start>0</start>
              <end>34</end>
            </item>
            <item name="Motherboard__serial__number">
              <regex>\\w+</regex>
              <named>true</named>
              <start>34</start>
              <end>45</end>
            </item>
          </groups>
          <sampleMatch>Motherboard serial number    :
          CAT0848076Z</sampleMatch>
          <regexMapMode>Line</regexMapMode>
          <optional>true</optional>
        </item>
        <item name="colon__auto4">
          <groups>
            <item name="heading">
              <regex>Power supply serial number\\s+:\\s</regex>
              <start>0</start>
              <end>34</end>
            </item>
            <item name="Power__supply__serial__number">
              <regex>\\w+</regex>
              <named>true</named>
              <start>34</start>
              <end>45</end>
            </item>
          </groups>
          <sampleMatch>Power supply serial number    :
DAB08440HMS</sampleMatch>
            <regexMapMode>Line</regexMapMode>
            <optional>true</optional>
          </item>
        </regexMaps>
      </item>
      <item type="com.fnfr.svt.mapping.table.
      TabularMapperProperties">
        <tabularMaps>
          <item name="auto1">
          <banner>Switch\\s+Ports\\s+Model\\s+SW
```

-continued

```
        Version\\s+SW Image\\s*</banner>
        <bannerStructure>Regex</bannerStructure>
        <minOccurences>0</minOccurences>
        <columns>
          <item name="Switch">
            <isKey>true</isKey>
            <width>6</width>
          </item>
          <item name="Ports">
            <width>10</width>
          </item>
          <item name="Model">
            <width>19</width>
          </item>
          <item name="SW__Version">
            <width>24</width>
          </item>
          <item name="SW__Image">
            <width>999</width>
          </item>
        </columns>
      </item>
    </tabularMaps>
  </item>
 </mapperProperties>
</ResponseMap>
```

Once the response map is generated, in step 308, testing system 200 applies the response map to the sample response or other similar responses from SUT 220 that have common format, in order to extract values corresponding to queries identified by the response map. No new response map or "template" needs to be generated even if other responses are received by testing system 200 as long as such other responses share text of same format as that of the sample response used to generate the response map. The response map generated based on the sample response may be applied to the new response to apply the queries identified in the response map and extract values corresponding to the queries to determine results of the system verification test on SUT 220. Step 308 of applying the response map is explained in greater detail below with reference to FIG. 4B.

Figure 4A:
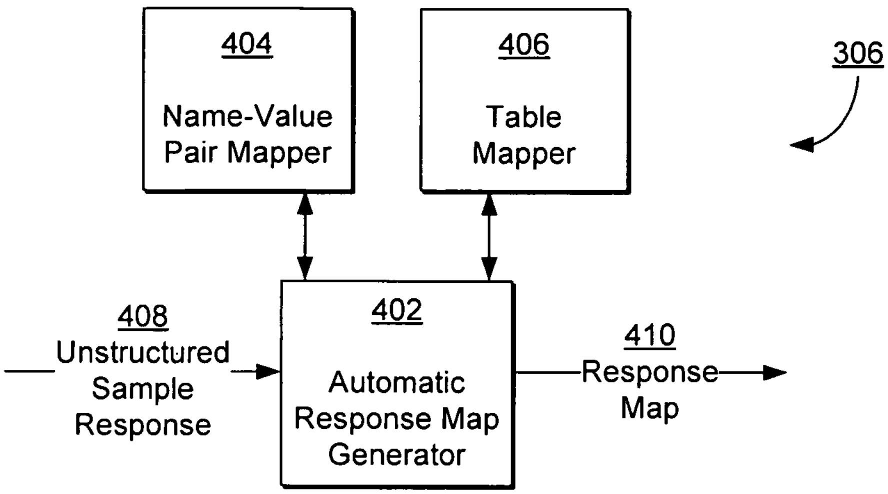
FIG. 4A illustrates the step of generating a response map in FIG. 3 in more detail, according to one embodiment of the present invention.

FIG. 4A illustrates the step 306 of generating a response map in FIG. 3 in more detail, according to one embodiment of the present invention. The response map 410 is generated by automatic response map generator 402 based on a sample response 408 that may be unstructured, with contributions by various auto-mappers such as name-value pair mapper 404 and table mapper 406. Automatic response map generator 402 receives the sample response 408 and passes it onto the first auto-mapper, which is the name-value pair mapper 404 in the example of FIG. 4A.

Name-value pair mapper 404 exploits the fact that many pieces of scalar data (i.e., pieces of information that appear at most once in a sample response) are represented using a "name:value" format—where a name is placed on a line of text followed by a colon (:) or equals-sign (=) followed by the value associated with that name. Name-value pair mapper 404 processes each line in the sample response looking for text that appear to conform to this "name:value" or "name=value" format. If such text in the "name:value" or "name=value" format is found, a new regular expression is generated that is used to check to see if that same name:value or name=value structure (with the same name) appears elsewhere in the same response. If so, then this pattern is rejected (as it may suggest a "false positive" identification of a scalar name/value pair). Otherwise, name-value pair mapper 404 causes response map generator 402 to add a new entry with the found "name:value" or "name=value" format to the response map 410, and a query is added so that the value in the name-value pair can be extracted by referring to the name. This process is repeated by name-value pair mapper 404 for each line in the sample response 408.

Next, automatic response map generator 402 passes the unstructured sample response 408 onto the next auto-mapper, which is the table mapper 406 in the example of FIG. 4A. Table mapper 406 is optimized for detecting and describing tables that commonly appear within textual sample responses and often carry important information that needs to be extracted. A variety of algorithms may be used to identify tables in the sample response 408, and more details of examples of such algorithms are provided below with reference to FIG. 5B. With information on the tables identified, table auto-mapper 406 defines primitives on how to find a matching table with identical format in future similar SVT responses and how to break the matching table into rows and columns, and generate the queries associated with the primitives. In one embodiment, the table mapper 406 also searches through the contents of the cells in the columns of the identified table starting from the left to identify the first column in the table where all of the values in the cells of that column are non-blank and distinct. This column is identified as the "key column." In one embodiment, queries for each cell in the identified table are generated using the name of the key column and the value of the cell in the key column in the same row as the row to which each cell belongs, so that the query for each cell can be uniquely referred to. Then, table mapper 406 causes response map generator 402 to add a new entry with the found table format with the defined primitives to the response map 410, and the queries associated with the table are also added to the response map 410.

Automatic response map generator 402 receives the primitives identified and provided by name-value pair mapper 404 and table mapper 406 that define the formats of text associated with such auto-mappers 404, 406, combines the primitives and generates the response map 410. As explained above, the response map 410 descriptively models the sample response 408 to identify and extract selected data from various blocks of text corresponding to the "modeled" format of text. As shown in Example 2 above, response map 410 may be generated as XML code. Although the example of FIG. 4A illustrates only name-value mapper 404 and table mapper 406 for simplicity of illustration, other auto-mappers for identifying other formats of text within the sample response 408 can be added to the chain of auto-mappers to generate the response map 410.

Figure 4B:
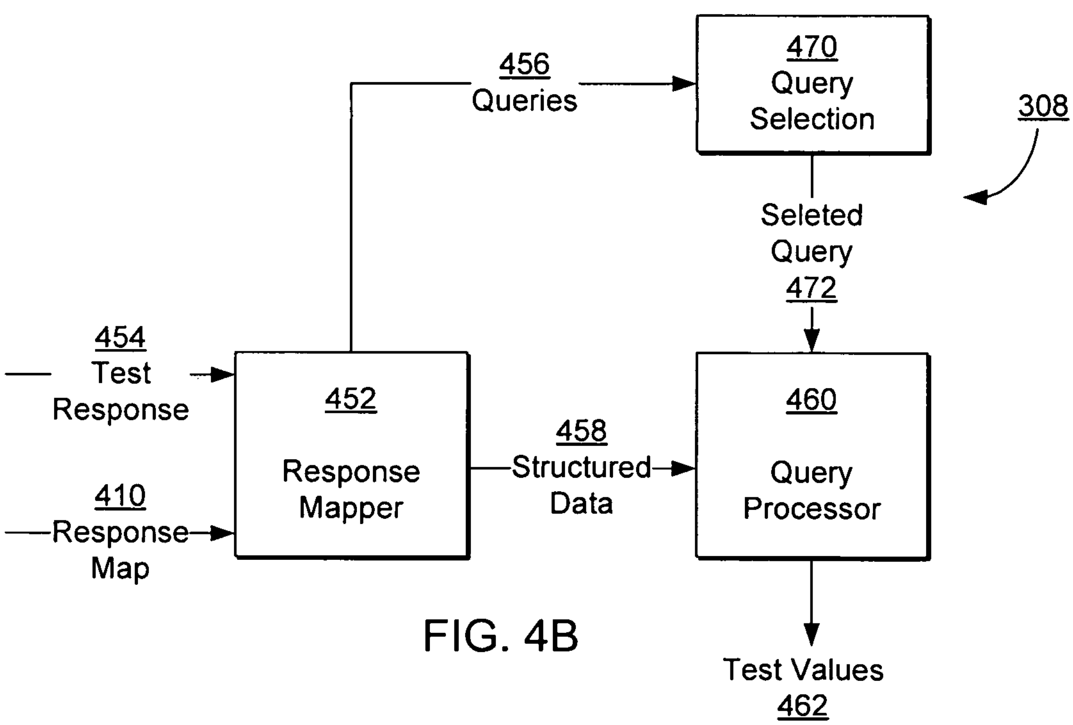
FIG. 4B illustrates the step of applying a response map in FIG. 3 in more detail, according to one embodiment of the present invention.

FIG. 4B illustrates the step 308 of applying a response map in FIG. 3 in more detail, according to one embodiment of the present invention. Response mapper 452 receives the response map 410 generated by automatic response map generator 402, and a test response 454 received from SUT 220 as a result of system verification testing on SUT 220. The test response may be the very sample response 408 used to generate the response map 410, or another new response that is different in content from the sample response 410 but include text in the same format of text as that of the sample response 408. Response mapper 452 applies the response map 410 to the test response 454 to identify the format of text defined by the response map 410 in the test response and identifies the queries 456 associated with the identified format of text. In addition, response mapper 452 converts the test response 454 (which may be unstructured) to structured data 458. The generated queries 456 are sent to a query selection module 470 in which one of the generated queries is selected. Such selected query 272 is provided to query processor 260 together with the structured data 458 generated by response mapper 452. Query processor 460 receives the selected query 472 and the structured data 458 and applies the selected query 472 to the structured data 458 to generate test values 462 extracted from the test response 454.

More specifically and referring back to FIG. 4A together with FIG. 4B, the queries 456 were generated by each individual auto-mapper 404, 408 based on an a priori understanding of the nature of the data that they are working on. For example, the name-value pair mapper 404 creates scalar queries—meaning that each query has a name, no arguments, and returns a value. For name-value pair mapper 404, the name of the query is simply a simplified version of the string preceding the colon on each line. The value returned is the string on the right side of the colon. For a table mapper 406, the queries are more complicated. Typically, the value from an individual cell in the table by row and column may need to be extracted. The column is identified by the name in the heading of that column (e.g., "Packets"). The row is identified by the value of the contents of the key column in that row. If the key column is, say, "Port", then one might have a set of parameterized queries of the form <column_name>_by_<key_column_name> and will require one argument which is the value appearing in the key column for the desired row, e.g., "Packets_by_Port("Ethernet5").

In one embodiment, the structured data 458 is stored as XML code. Each response mapper 452 creates its own schema of XML, and the queries 456 are translated into XPATH (XML PATH) queries against that schema by the response mapper 452. With respect to name-value pair patterns, response mapper 452 searches through test response 454 for matches in the patterns with patterns identified in the response map 410. For each matching pattern, response mapper 410 creates a new node in the XML structured data 458 accordingly. Then under that node, response mapper 410 creates one node for each match against that pattern. And within that node, response mapper 410 stores the value found in the response for that match. For tables, the schema is slightly more complex, in that nodes in the XML structured data 458 represent table instances found, containing child nodes for each row, which, in turn, contain nodes for each column, in turn containing values representing the corresponding cells.

The following EXAMPLE 3 is an example of the structured data 458 generated by response mapper 452, based on the sample response of EXAMPLE 1 above and the response map of EXAMPLE 2 above.

EXAMPLE 3

```
- <structure xmlns:map="http://www.fnfr.com/svt/mapping">
- <mapped>
- <Regex id="com.fnfr.svt.mapping.regex">
- <Body>
- <pattern1 map:endcol="34" map:line="0" map:linecount="2" map:startcol="0">
  <Uptime map:endcol="12" map:line="0" map:nodetype="token"
map:startcol="10">10</Uptime>
  <days map:endcol="21" map:line="0" map:nodetype="token" map:startcol="20">5</days>
  <hours map:endcol="29" map:line="0" map:nodetype="token"
map:startcol="28">6</hours>
  <minutes map:endcol="38" map:line="0" map:nodetype="token"
map:startcol="37">5</minutes>
  </pattern1>
  <line />
  <line />
  <line />
- <line>
- <colon__auto1 map:endcol="40" map:line="3" map:startcol="0">
  <Motherboard__assembly__number map:endcol="40" map:line="3" map:nodetype="token"
map:startcol="30">73-7055-08</Motherboard__assembly__number>
  </colon__auto1>
  </line>
- <line>
- <colon__auto2 map:endcol="41" map:line="4" map:startcol="0">
  <Power__supply__part__number map:endcol="41" map:line="4" map:nodetype="token"
map:startcol="30">341-0034-01</Power__supply__part__number>
  </colon__auto2>
  </line>
- <line>
- <colon__auto3 map:endcol="41" map:line="5" map:startcol="0">
  <Motherboard__serial__number map:endcol="41" map:line="5" map:nodetype="token"
map:startcol="30">CAT0848076Z</Motherboard__serial__number>
  </colon__auto3>
  </line>
- <line>
- <colon__auto4 map:endcol="41" map:line="6" map:startcol="0">
  <Power__supply__serial__number map:endcol="41" map:line="6" map:nodetype="token"
map:startcol="30">DAB08440HMS</Power__supply__serial__number>
  </colon__auto4>
  </line>
  <line />
  <line />
  <line />
  <line />
  <line />
  <line />
  <line />
  <line />
  </Body>
```

-continued

```
  </Regex>
- <Tabular id="com.fnfr.svt.mapping.table">
- <table1>
- <table map:line="9" map:linecount="5" map:nodetype="table">
- <banner map:line="8" map:linecount="1">
  <match map:line="8" map:linecount="1" />
  </banner>
- <row map:line="9" map:linecount="1" map:nodetype="row">
  <Switch map:endcol="1" map:line="9" map:nodetype="token"
map:startcol="0">1</Switch>
  <Ports map:endcol="11" map:line="9" map:nodetype="token" map:startcol="9">26</Ports>
  <Model map:endcol="33" map:line="9" map:nodetype="token" map:startcol="20">WS-
C3750-24TS</Model>
  <SW_Version map:endcol="53" map:line="9" map:nodetype="token"
map:startcol="42">12.2(20)SE3</SW_Version>
  <SW_Image map:endcol="70" map:line="9" map:nodetype="token"
map:startcol="63">I5K91-M</SW_Image>
  </row>
- <row map:line="10" map:linecount="1" map:nodetype="row">
  <Switch map:endcol="1" map:line="10" map:nodetype="token"
map:startcol="0">2</Switch>
  <Ports map:endcol="11" map:line="10" map:nodetype="token"
map:startcol="9">24</Ports>
  <Model map:endcol="32" map:line="10" map:nodetype="token" map:startcol="20">WS-
C2950-22T</Model>
  <SW_Version map:endcol="53" map:line="10" map:nodetype="token"
map:startcol="42">12.1(20)SE2</SW_Version>
  <SW_Image map:endcol="70" map:line="10" map:nodetype="token"
map:startcol="63">I2K57-A</SW_Image>
  </row>
- <row map:line="11" map:linecount="1" map:nodetype="row">
  <Switch map:endcol="1" map:line="11" map:nodetype="token"
map:startcol="0">3</Switch>
  <Ports map:endcol="11" map:line="11" map:nodetype="token"
map:startcol="9">12</Ports>
  <Model map:endcol="32" map:line="11" map:nodetype="token" map:startcol="20">WS-
C3750-12A</Model>
  <SW_Version map:endcol="50" map:line="11" map:nodetype="token"
map:startcol="42">12.4(26)</SW_Version>
  <SW_Image map:endcol="70" map:line="11" map:nodetype="token"
map:startcol="63">I5K91-B</SW_Image>
  </row>
- <row map:line="12" map:linecount="1" map:nodetype="row">
  <Switch map:endcol="1" map:line="12" map:nodetype="token"
map:startcol="0">4</Switch>
  <Ports map:endcol="11" map:line="12" map:nodetype="token"
map:startcol="9">26</Ports>
  <Model map:endcol="33" map:line="12" map:nodetype="token" map:startcol="20">WS-
C2940-24QQ</Model>
  <SW_Version map:endcol="53" map:line="12" map:nodetype="token"
map:startcol="42">12.3(10)SE1</SW_Version>
  <SW_Image map:endcol="70" map:line="12" map:nodetype="token"
map:startcol="63">I5L91-X</SW_Image>
  </row>
- <row map:line="13" map:linecount="1" map:nodetype="row">
  <Switch map:endcol="1" map:line="13" map:nodetype="token"
map:startcol="0">5</Switch>
  <Ports map:endcol="10" map:line="13" map:nodetype="token" map:startcol="9">8</Ports>
  <Model map:endcol="32" map:line="13" map:nodetype="token" map:startcol="20">AB-
C4420-8TS</Model>
  <SW_Version map:endcol="53" map:line="13" map:nodetype="token"
map:startcol="42">12.2(20)SE3</SW_Version>
  <SW_Image map:endcol="70" map:line="13" map:nodetype="token"
map:startcol="63">I4L91-X</SW_Image>
  </row>
  <footer map:line="14" map:linecount="1" />
  </table>
  </table1>
  </Tabular>
  </mapped>
  </structure>
```

Figure 5A:
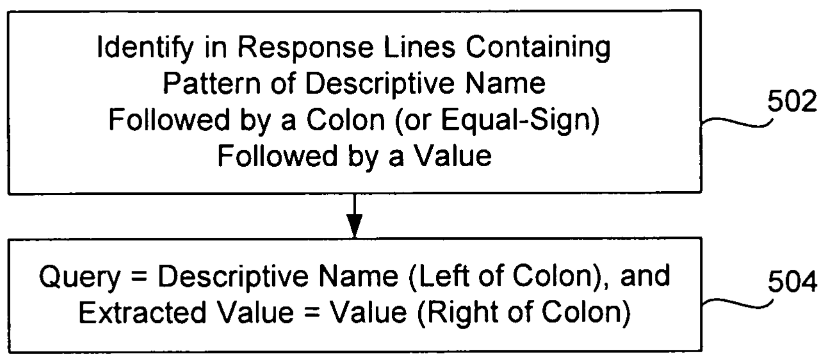
FIG. 5A illustrates a method of mapping name-value pairs to generate a response map, according to one embodiment of the present invention.

FIG. 5A illustrates a method of mapping name-value pairs to generate a response map, according to one embodiment of the present invention. The method of FIG. 5A is performed by name-value mapper 404 in order to identify text in "name: value" or "name=value" pair format in the sample response 408. In step 502, name-value pair mapper 404 looks for and identifies in the sample response 408 lines that contain a pattern of a descriptive name followed by a colon (or equal-sign) followed by a value of some kind. A regular expression can be used to find these patterns within the sample 408 response. Regular expressions provide a concise and flexible means for identifying strings of text of interest, such as particular characters, words, or patterns of characters. Regular expressions are typically written in a formal language that can be interpreted by a regular expression processor, a program that either serves as a parser generator or examines text and identifies parts that match the provided specification. In step 504, a query associated with the identified name-value pattern is generated together with a value corresponding to the query. The query generated for such name-value pair data includes at least the name part of the data on the left of the colon (or equal-sign). The corresponding extracted value is the string to the right of the colon (or equal-sign) on the same line. In Example 1 above, the following are examples of name-value pair data:

| | |
|---|---|
| Motherboard assembly number: | 73-7055-08 |
| Power supply part number: | 341-0034-01 |
| Motherboard serial number: | CAT0848076Z |
| Power supply serial number: | DAB08440HMS |

Also, in Example 1 above, a query could be Motherboard_assembly_number( ), and value "73-7055-08" may be returned from this query.

Figure 5B:
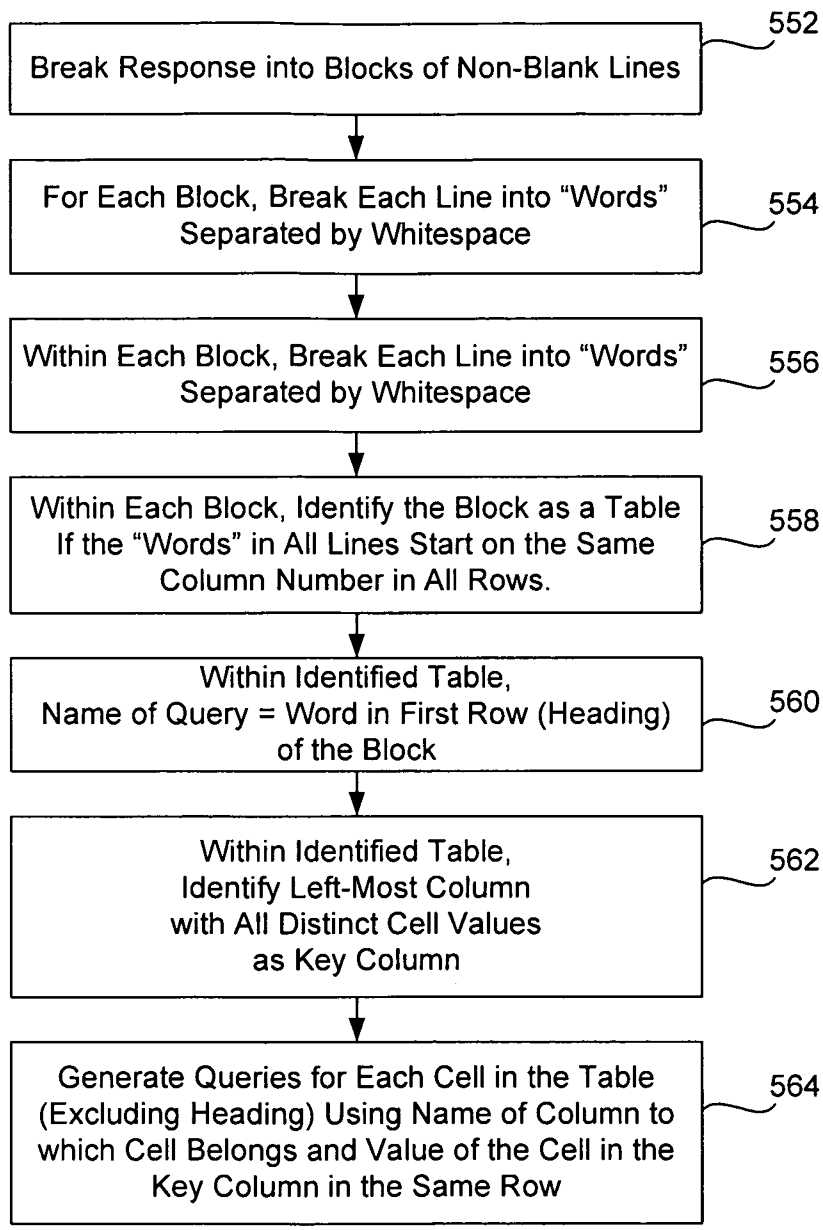
FIG. 5B illustrates a method of mapping tables to generate a response map, according to one embodiment of the present invention.

FIG. 5B illustrates a method of mapping tables to generate a response map, according to one embodiment of the present invention. The method of FIG. 5B is performed by table mapper 406 in order to identify text in columnar table format in the sample response 408. The column headings of the table are used as the name of the query to extract data from that column. If a key column is identified, then the query is parameterized—taking an argument representing the value of the cell in the key column. In other words, the query is generated using the name of the column combined with the value of the cell in the key column in the same row as the row of the cell at issue.

For example, in Example 1 above, the following is identified as data in table format:

| Switch | Ports | Model | SW Version | SW Image |
|---|---|---|---|---|
| 1 | 26 | WS-C3750-24TS | 12.2(20)SE3 | I5K91-M |
| 2 | 24 | WS-C2950-22T | 12.1(20)SE2 | I2K57-A |
| 3 | 12 | WS-C3750-12A | 12.4(26) | I5K91-B |
| 4 | 26 | WS-C2940-24QQ | 12.3(10)SE1 | I5L91-X |
| 5 | 8 | AB-C4420-8TS | 12.2(20)SE3 | I4L91-X |

Also, in Example 1 above, the "Switch" number column is the key column, since it is the left-most column in the table with values that are all distinct (1, 2, 3, 4, and 5 in this example). Thus, a query could be Model_by_Switch(switch_number). The query Model_by_Switch(3) would return a cell value "WS-C3750-12A" in Example 1 above.

An algorithm for detecting and analyzing a table within the sample response 408 begins by step 552 in which the sample response 408 is broken into blocks of contiguous non-blank lines, while ignoring blocks with fewer than 3 lines. In step 554, for each such block, each line is broken into "words" separated by whitespace. In step 556, if the "words" in all lines start on the same column numbers (or column positions) in all rows within each block, then that block is identified as a table and assigned a unique table name (e.g., "table1"). In step 558, the headings in the identified table (i.e., the words in the first row of the block) become the names of queries for extracting values from the corresponding columns in the table. In addition, in step 562, the left-most column of the table with all distinct cell values is identified as the key column of that table. Finally, in step 564, queries for each cell in the table (excluding the heading) are generated using the name of the column combined with the value of the cell in the key column in the same row as the row of that cell at issue.

Figure 6A:
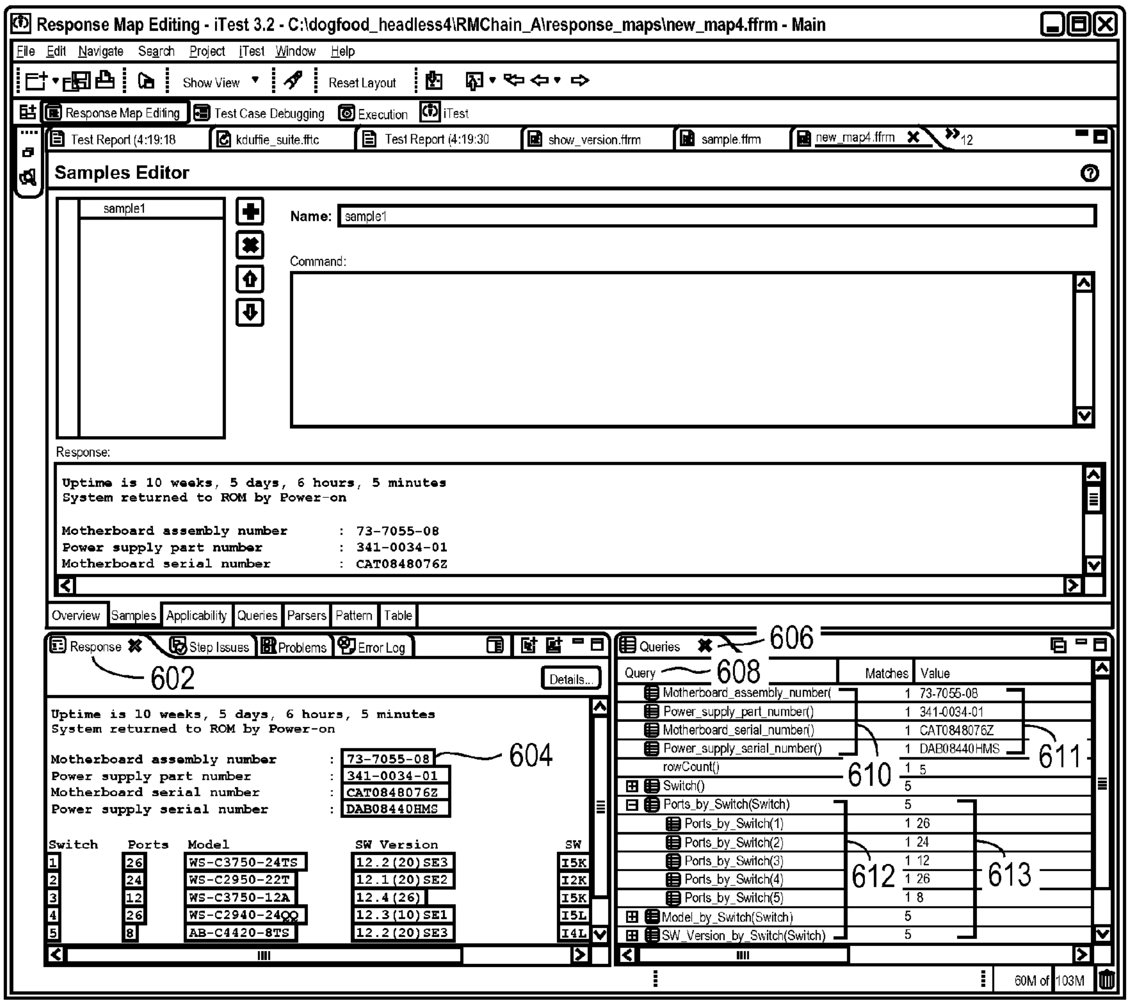
FIG. 6A illustrates an example screenshot of a response map editor, according to one embodiment of the present invention.

FIG. 6A illustrates an example screenshot of a response map editor, according to one embodiment of the present invention. Such response map editor may be provided by response map generator 402 (FIG. 4) as a user interface for viewing and editing the response map 410 generated according to embodiments of the present invention. Referring to FIG. 6A, the "Response" view 602 shows the sample response 408 with lined boxes 604 around the portions of the response (i.e., values) that can be extracted using the response map 410. The queries view 606 show the list of queries 608 that are available for extracting information from the sample response 408 or other new responses with a format same as that of the sample response 408. Such queries 608 include queries 610 generated by name-value pair mapper 404 with their corresponding values 611 and queries 612 generated by table mapper 406 with their corresponding values 613. Note that all the queries 610, 612 are generated automatically by the auto-mapper 404, 406, respectively, and by response map generator 402 without requiring any manual intervention other than providing them with the sample response 408.

Figure 6B:
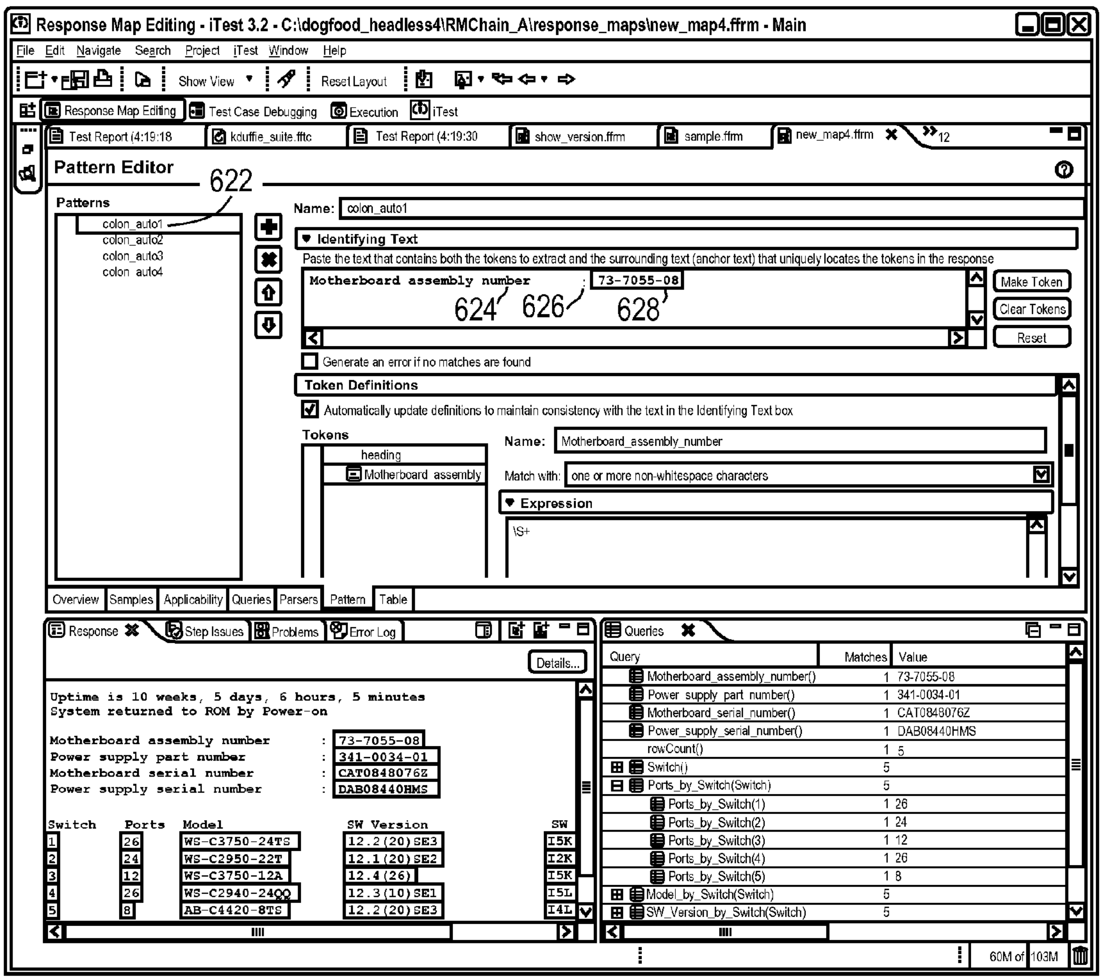
FIG. 6B illustrates an example screenshot of a pattern (name-value pair) editor of the response map editor of FIG. 6A, according to one embodiment of the present invention.

FIG. 6B illustrates an example screenshot of a pattern (name-value pair) editor of the response map editor of FIG. 6A, according to one embodiment of the present invention. As shown in FIG. 6B, name-value pair mapper 404 has generated a response map 410 that identifies a pattern called "colon_auto1" 622 that looks for a line containing "Motherboard assembly number :" 624, 626 followed by any text 628, and it is that text 628 (73-7055-08 in this example) after the colon 626 that will be extracted using a query called Motherboard_assembly_number( ).

Figure 6C:
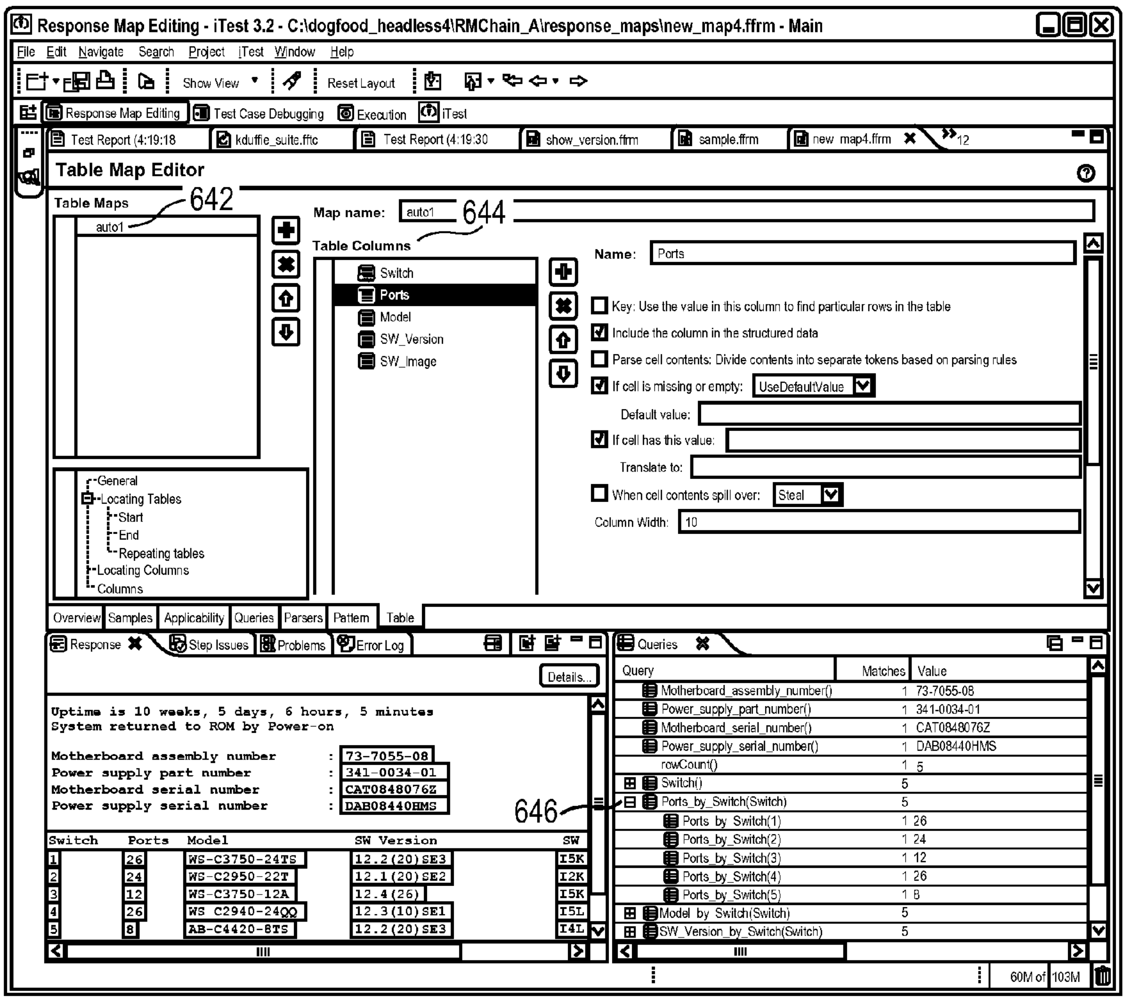
FIG. 6C illustrates an example screenshot of a table editor of the response map editor of FIG. 6A, according to one embodiment of the present invention.

FIG. 6C illustrates an example screenshot of a table editor of the response map editor of FIG. 6A, according to one embodiment of the present invention. As shown in FIG. 6C, table mapper 406 has generated a response map 410 including a table map referred to as "auto1" 642 that contains five named columns 644 ("Switch", "Ports", "Model", "SW_Version" and "SW_Image") with information about how to locate and extract information from each column. In addition, table mapper 406 has created queries such as "Ports_by_Switch(Switch)" 646.

Figure 7A:
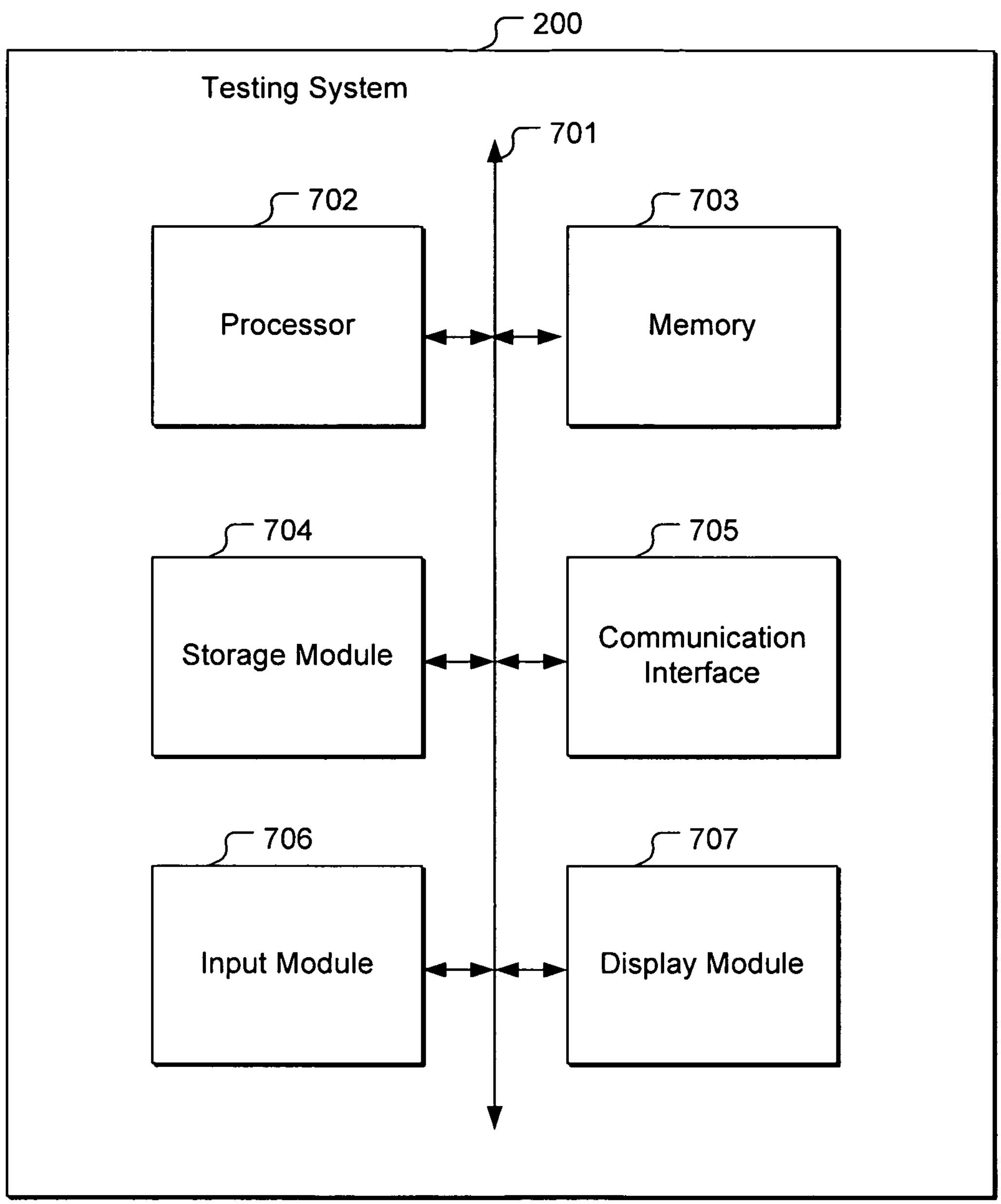
FIG. 7A illustrates the hardware architecture of a SVT testing system, according to one embodiment of the present invention.

FIG. 7A illustrates the hardware architecture of a testing system, according to one embodiment of the present invention. In one embodiment, the testing system 200 is a server computer including components such as a processor 702, a memory 703, a storage module 704, an input module (e.g., keyboard, mouse, and the like) 706, a display module 707, and a communication interface 705, exchanging data and control signals with one another through a bus 701. The storage module 704 is implemented as one or more computer readable storage medium (e.g., hard disk drive), and stores software that is run by the processor 702 in conjunction with the memory 703 to implement the automatic response map generation and application to test responses according to embodiments of the present invention as illustrated herein. Operating system software and other application software may also be stored in the storage device 704 to run on the processor 702. Note that not all components of the testing system 200 are shown in FIG. 7A and that certain components not necessary for illustration of the present invention are omitted herein.

Figure 7B:
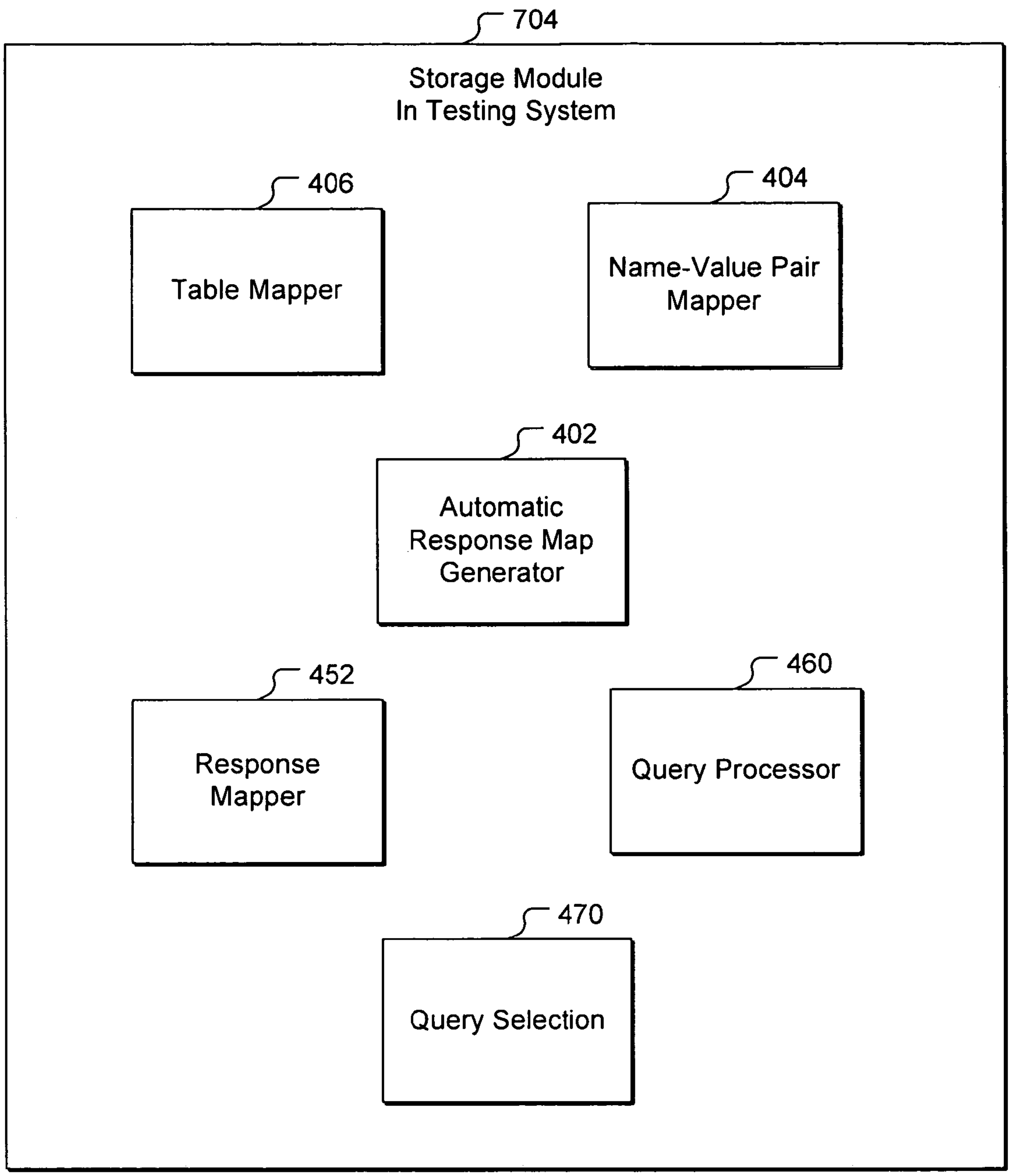
FIG. 7B illustrates the software modules for response map generation and application in the SVT testing system, according to one embodiment of the present invention.

FIG. 7B illustrates the software modules for response map generation and application in the testing system 200, according to one embodiment of the present invention. The software modules include table mapper 406, name-value pair mapper 404, automatic response map generator 402, response mapper 452, query processor 460, query selection module 470 and are implemented as computer instructions stored in storage module 704 and configured to cause processor 702 to operate in accordance with the various embodiments of the present invention as explained above with respect to each of these software modules. Other SVT software modules (not shown herein) may also be present in the storage module 704.

This present invention enables system verification test to be performed without the manual process of writing parsing software to extract data from a textual response or to create a template manually for the same purpose. Although the various embodiments of the present invention are illustrated in the context of extracting certain formatted data from textual responses received from system verification testing, the present invention may be similarly used to extract information from and parse any type of unstructured textual data in other fields or applications such as Optical Character Recognition (OCR) where printed materials are translated into an electronic format.

Upon reading this disclosure, those of skill in the art will appreciate still additional alternative designs for parsing and extracting information from unstructured textual data. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method of identifying and extracting data included in test responses from system verification testing of a system under test, the method comprising the steps of:

receiving at a test system, from the system under test, a first session of test responses in a system verification test, the test responses including a first unstructured textual portion including one or more first blocks of unstructured text in one or more formats, the first blocks of unstructured text including a plurality of lines of words separated by white spaces;

processing the first one or more blocks of unstructured text to discover the one or more formats of the first one or more blocks of unstructured text without a priori knowledge of the format of the first one or more blocks of unstructured text and without a priori knowledge of a template for the format;

generating a response map from the discovered formats for use in parsing one or more blocks of unstructured text from sessions of test responses; and applying the response map to a second session of test responses, including a second unstructured textual portion including one or more blocks of unstructured text in the discovered one or more formats, to identify and extract textual data from the one or more blocks of unstructured text in the discovered one or more formats.

2. The computer-implemented method of claim 1, wherein the response map comprises XML (eXtensible Mark-up Language) code modeling said first test responses.

3. The computer-implemented method of claim 1, further comprising the step of generating queries associated with said one or more formats based on the first test responses, the queries when executed configured to extract values corresponding to the queries from the second test responses converted to a structured format.

4. The computer-implemented method of claim 1, wherein the step of processing the first one or more blocks of unstructured text includes the step of identifying first unstructured textual data in a form of a name followed by a corresponding value.

5. The computer-implemented method of claim 4, wherein the step of identifying the first unstructured textual data in a form of a name followed by a corresponding value includes:

identifying in the first test responses a line including a pattern of the name followed by the corresponding value; and generating a query identified by the name, the corresponding value being extracted by the query.

6. The computer-implemented method of claim 1, wherein the step of processing the first one or more blocks of unstructured text include the step of identifying the first unstructured textual data in a form of a table.

7. The computer-implemented method of claim 6, wherein the step of identifying the first unstructured textual data in a form of a table includes:

breaking the first test responses into one or more blocks of non-blank lines;

within each block, breaking each line into one or more words separated by whitespace; and for each block, identifying said each block as a table if the words in all lines of said each block start on a same column position in all rows of said each block.

8. The computer-implemented method of claim 7, wherein the step of identifying the first unstructured textual data in a form of a table further includes:

identifying a left-most column cell with values of all cells in the left-most column being distinct as a key column of the identified table; and generating a query for at least one of the cells in the identified table using a column name of a column of the identified table to which said at least one of the cells belong and a cell value of another cell in the key column on a same row as said one of the cells.

9. The computer-implemented method of claim 1, wherein the first test responses and the second test responses are the same.

10. The computer-implemented method of claim 1, wherein the first test responses and the second test responses are different test responses.

11. A computer system including a processor and a computer readable storage medium storing computer instructions configured to cause the processor to perform a computer implemented method of identifying and extracting data included in test responses from system verification testing of a system under test, the method comprising the steps of:

receiving a first test response including a first block of unstructured text in one or more formats, the first block of unstructured text including a plurality of lines of words separated by white spaces;

processing the first block of unstructured text to discover the one or more formats of the first block of unstructured text without a priori knowledge of the format of the first block of unstructured text and without a priori knowledge of a template for the format;

generating a response map from the discovered formats for use in parsing unstructured text from a test response; and applying the response map to a second test response, including a second block of unstructured text in the discovered formats, to identify and extract textual data from the second block of unstructured text.

12. The computer system of claim 11, wherein the response map comprises XML (eXtensible Mark-up Language) code modeling said first test response.

13. The computer system of claim 11, wherein the method further comprises the step of generating queries associated with said one or more formats based on the first test response, the queries when executed configured to extract values corresponding to the queries from the second test response converted to a structured format.

14. The computer system of claim 11, wherein the step of processing the first block of unstructured text includes the step of identifying first textual data in a form of a name followed by a corresponding value.

15. The computer system of claim 14, wherein the step of identifying the first textual data in a form of a name followed by a corresponding value includes:

identifying in the first test response a line including a pattern of the name followed by the corresponding value; and generating a query identified by the name, the corresponding value being extracted by the query.

16. The computer system of claim 11, wherein the step of processing the first block of unstructured text includes the step of identifying the first textual data in a form of a table.

17. The computer system of claim 16, wherein the step of identifying the first textual data in a form of a table includes:

breaking the first test response into one or more blocks of non-blank lines;

within each block, breaking each line into one or more words separated by whitespace; and for each block, identifying said each block as a table if the words in all lines of said each block start on a same column position in all rows of said each block.

18. The computer system of claim 17, wherein the step of identifying the first textual data in a form of a table further includes:

identifying a left-most column cell with values of all cells in the left-most column being distinct as a key column of the identified table; and generating a query for at least one of the cells in the identified table using a column name of a column of the identified table to which said at least one of the cells belong and a cell value of another cell in the key column on a same row as said one of the cells.

19. The computer system of claim 11, wherein the first test response and the second test response are the same.

20. The computer system of claim 11, wherein the first test response and the second test response are different test responses.

21. A computer readable storage medium storing a computer program product including computer instructions configured to cause a processor of a computer to perform a computer implemented method of identifying and extracting data included in test responses from system verification testing of a system under test, the method comprising the steps of:

receiving a first session of test responses in a system verification test, the test responses including first a unstructured textual portion including first one or more blocks of unstructured text in one or more formats, the first blocks of unstructured text including a plurality of lines of words separated by white spaces;

processing the first one or more blocks of unstructured text to discover the one of more formats of the one or more blocks of unstructured text without a priori knowledge of the format of the first one or more blocks of unstructured text and without a priori knowledge of a template for the format;

generating a response from the discovered formats for use in parsing one or more blocks of unstructured text from sessions of test responses; and applying the response map to a second session of test responses, including a second unstructured textual portion including one or more blocks of unstructured text in the discovered one or more formats, to identify and extract textual data from the one or more blocks of unstructured text in the discovered one or more formats.

22. The computer readable storage medium of claim 21, wherein the response map comprises XML (eXtensible Mark-up Language) code modeling said first test responses.

23. The computer readable storage medium of claim 21, wherein the method further comprises the step of generating queries associated with said one or more formats based on the first test responses, the queries when executed configured to extract values corresponding to the queries from the second test responses converted to a structured format.

24. The computer readable storage medium of claim 21, wherein the step of processing the first one or more blocks of unstructured text includes the step of identifying first unstructured textual data in a form of a name followed by a corresponding value.

25. The computer readable storage medium of claim 24, wherein the step of identifying the first unstructured textual data in a form of a name followed by a corresponding value includes:

identifying in the first test responses a line including a pattern of the name followed by the corresponding value; and generating a query identified by the name, the corresponding value being extracted by the query.

26. The computer readable storage medium of claim 21, wherein the step of processing the first one or more blocks of unstructured text include the step of identifying the first unstructured textual data in a form of a table.

27. The computer readable storage medium of claim 26, wherein the step of identifying the first unstructured textual data in a form of a table includes:

breaking the first test responses into one or more blocks of non-blank lines;

within each block, breaking each line into one or more words separated by whitespace; and for each block, identifying said each block as a table if the words in all lines of said each block start on a same column position in all rows of said each block.

28. The computer readable storage medium of claim 27, wherein the step of identifying the first unstructured textual data in a form of a table further includes:

identifying a left-most column cell with values of all cells in the left-most column being distinct as a key column of the identified table; and generating a query for at least one of the cells in the identified table using a column name of a column of the identified table to which said at least one of the cells belong and a cell value of another cell in the key column on a same row as said one of the cells.

29. The computer readable storage medium of claim 21, wherein the first test responses and the second test responses are the same.

30. The computer readable storage medium of claim 21, wherein the first test responses and the second test responses are different test responses.

31. A computer-implemented method of identifying and extracting data included in documents, the method comprising the steps of:

receiving a first document including first unstructured textual portion including first one or more blocks of unstructured text in one or more formats, the first blocks of unstructured text including a plurality of lines of words separated by white spaces;

processing the first one or more blocks of unstructured text to discover the one or more formats of the first one or more blocks of unstructured text without a priori knowledge of the format of the first one or more blocks of unstructured text and without a priori knowledge of a template for the format;

generating a response map from the discovered formats for use in parsing one or more blocks of unstructured text from a test response; and applying the response map to a second document, including a second unstructured textual portion including one or more blocks of unstructured text in the discovered one or more formats, to identify and extract textual data from the one or more blocks of unstructured text in the discovered one or more formats.

* * * * *